US006934538B1

(12) United States Patent
Sakaguchi

(10) Patent No.: US 6,934,538 B1
(45) Date of Patent: Aug. 23, 2005

(54) PORTABLE TELEPHONE SET FOR DETECTING RADIO WAVE INTERFERENCE ON SWITCHED PERCH CHANNELS AND DISPLAYING INTERFERENCE WARNING

(75) Inventor: Ikuo Sakaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 501 days.

(21) Appl. No.: 09/708,516

(22) Filed: Nov. 9, 2000

(30) Foreign Application Priority Data

Nov. 10, 1999 (JP) .......................................... 11-319285

(51) Int. Cl.⁷ ........................................... H04M 11/00

(52) U.S. Cl. .................... 455/421; 455/67.7; 455/226.4

(58) Field of Search .............................. 455/421, 226.4, 455/67.4, 556.1, 422.1, 456.1, 566, 63.1, 67.1, 226.2, 226.3, 522, 63, 556.2, 554, 555, 567, 557

(56) References Cited

U.S. PATENT DOCUMENTS

| 5,134,708 | A | * | 7/1992 | Marui et al. ................. | 455/421 |
|---|---|---|---|---|---|
| 5,257,400 | A | * | 10/1993 | Yoshida ....................... | 455/434 |
| 5,289,178 | A | * | 2/1994 | Schwendeman ........... | 340/7.58 |
| 5,373,548 | A | * | 12/1994 | McCarthy ................... | 455/462 |
| 5,383,221 | A | * | 1/1995 | Akita et al. .................. | 375/219 |
| 5,450,613 | A | * | 9/1995 | Takahara et al. ............ | 455/517 |
| 5,451,839 | A | * | 9/1995 | Rappaport et al. .......... | 375/224 |
| 5,467,341 | A | * | 11/1995 | Matsukane et al. ......... | 370/253 |
| 5,535,425 | A | * | 7/1996 | Watanabe .................... | 455/436 |
| 5,722,068 | A | * | 2/1998 | Bartle et al. ................. | 455/421 |
| 5,765,113 | A | * | 6/1998 | Russo et al. ................. | 455/557 |
| 5,805,666 | A | * | 9/1998 | Ishizuka et al. ............. | 379/1.01 |

(Continued)

FOREIGN PATENT DOCUMENTS

| EP | 0583172 A1 | 8/1993 | ............. G10L/5/00 |
|---|---|---|---|
| GB | 2307623 A | 5/1997 | ........... H04B/17/00 |
| GB | 2330493 A | 4/1999 | ............ H04Q/7/32 |
| GB | 2339647 A | 2/2000 | ............ H04Q/7/32 |
| JP | 8-51394 | 2/1996 | |
| JP | 11-69455 | 3/1999 | |
| JP | 2000261370 A | 9/2000 | ............ H04B/7/26 |

OTHER PUBLICATIONS

RCR STD–27, "Personal Digital Cellular Telecommunication System", Corporation of Association of Radio Wave Industry, p. 834–838.
Japanese Patent Office Office Action mailed Jul. 10, 2002; English translation of relevent portions.
Chinese Office Action dated Jan. 31, 2003.
English translation of Chinese Office Action dated Jan. 31, 2003.

Primary Examiner—Tilahun Gesesse
(74) Attorney, Agent, or Firm—Whitham, Curtis & Christofferson, PC

(57) ABSTRACT

A portable telephone radio unit is disclosed which allows a user to recognize an incomplete state of data communication which occurs with a terminal equipment because of deterioration of the communication state by radio wave interference upon channel changing over in the course of a standby channel selection operation or during communication. A signal processing section performs information analysis of a signal selected by a control circuit section from among reception signals of an antenna whose levels are measured by a radio circuit section upon channel changing over in the course of a standby channel selection operation or during communication. The control circuit section detects loss of frame synchronization, deterioration in bit error rate, unfavorable reception of broadcast information or interruption of radio waves which is a condition of radio wave interference. Then, if a waiting condition is not satisfied, then the control circuit section controls a warning display section to display a warning of radio wave interference. The radio wave interference warning is erased when the cause of the radio wave interference disappears.

8 Claims, 4 Drawing Sheets

U.S. PATENT DOCUMENTS

| | | | | |
|---|---|---|---|---|
| 5,809,414 A | * | 9/1998 | Coverdale et al. | 455/421 |
| 5,937,348 A | * | 8/1999 | Cina et al. | 455/421 |
| 5,960,335 A | * | 9/1999 | Umemoto et al. | 455/226.2 |
| 5,966,656 A | * | 10/1999 | Elkin et al. | 455/421 |
| 5,991,901 A | * | 11/1999 | Mulford et al. | 714/704 |
| 6,073,024 A | * | 6/2000 | Hasegawa | 455/522 |
| 6,078,816 A | * | 6/2000 | Weiss et al. | 455/450 |
| 6,131,046 A | * | 10/2000 | Sano et al. | 455/566 |
| 6,219,540 B1 | * | 4/2001 | Besharat et al. | 455/421 |
| 6,243,568 B1 | * | 6/2001 | Detlef et al. | 455/226.4 |
| 6,311,049 B1 | * | 10/2001 | Yoshizawa | 455/250.1 |
| 6,393,307 B1 | * | 5/2002 | Kim | 455/566 |
| 6,466,568 B1 | * | 10/2002 | Raith et al. | 370/347 |
| 6,556,822 B1 | * | 4/2003 | Matsumoto | 455/421 |

* cited by examiner

PORTABLE TELEPHONE SET FOR DETECTING RADIO WAVE INTERFERENCE ON SWITCHED PERCH CHANNELS AND DISPLAYING INTERFERENCE WARNING

BACKGROUND OF THE INVENTION

1. Field of the Invention

The present invention relates to a portable telephone radio set to which a terminal equipment as represented by a personal computer is connected to effect data communication therewith.

2. Description of the Related Art

In recent years, a portable telephone radio set is used in frequently such that a terminal equipment such as a personal computer is externally connected thereto to effect data communication therewith. However, the portable telephone radio set is liable to be subject to radio wave interference from the terminal equipment externally connected thereto and suffer from deterioration of the communication quality. Further, data communication is different from communication by voice, which allows confirmation with the ear, in that, even if the communication quality is deteriorated, this cannot be recognized readily by a user of the portable telephone radio set.

Conventionally, as regards a portable telephone radio set of the type described such as, for example, a portable telephone radio set which complies with the RCR STD-27 standard published by the Association of Radio Industries and Business (ARIB), a standard is available which relate to a waiting-switching operation, after the power supply to the portable telephone radio set is turned on, of the mobile station when a used channel set from a base state is in a wait state.

A procedure on the mobile state base on the standard is illustrated in FIG. 4. First, when the power supply is turned on, perch channels which form a group are scanned to measure the level of each of the channels (step S1), and a channel table in which the levels are arranged in order of the level is prepared (step S2).

Then, the mobile station searches for those perch channels each having a level higher than a predetermined level from within the channel table prepared in this manner (step S3). If perch channels having a level higher than the predetermined level are detected (YES in step S4), then one of those perch channels is selected in accordance with a predetermined method (step S5) and a signal of the selected perch channel is received (step S6). Then, information of the layer 1 and broadcast information are detected from within the received signal and analyzed (step S7), and if a waiting condition is satisfied (YES in step S8), then the processing advances to operation during the waiting state (step S9).

If the discrimination in step S8 is "NO" since the waiting condition is not satisfied, then the remaining perch channels each having a level higher than the predetermined level are investigated from within the channel table (step S10). Then, the processing returns to step S4 described above. Thus, the succeeding steps are repeated until the discrimination in step S4 becomes "NO" because a perch channel having a level higher than the predetermined level does not remain any more.

If the discrimination in step S4 is "NO" because there remains no perch channel having a level higher than the predetermined level, then it is determined that the mobile station is in an out-of-zone state (step S21). Then, the processing returns to step S1, in which scanning of perch channels of a next group is started.

In the conventional portable telephone radio set In described above, if interruption of communication or failure in connection is caused by radio wave interference and deteriorates the communication state, then since the user of the radio set cannot recognize that data communication on the terminal equipment has entered an incomplete state, there is a problem that increase of the communication time by unnecessary requests for retransmission, increase of the communication fee by unnecessary retransmission processing and so forth occur.

The reason is that the conventional portable telephone radio set does not have a function for directly reporting deterioration of the communication state caused by radio wave interference to the user of the portable telephone radio set.

SUMMARY OF THE INVENTION

It is an object of the present invention to provide a portable telephone radio set with an interference detection function which allows a user thereof to recognize an incomplete state of data communication occurring with a terminal equipment due to deterioration of the communication state caused by radio wave interference and take a countermeasure against the incomplete state of data communication.

In order to attain the object described above, according to the present invention, there is provided a portable telephone radio set with an interference detection function to which a terminal equipment can be externally connected to effect data communication therewith, comprising a warning section for warning radio wave interference, and a control circuit section for detecting interference of radio waves and controlling the warning section, the control circuit section reporting, when the control circuit section detects a radio wave interference fault, contents of the fault to the warning section so that the warning section may give a warning of radio wave interference in a predetermined form based on at least one of visibility and audibility.

With the portable telephone radio set, when a predetermined radio wave fault is detected, the user can readily recognize occurrence of the radio wave fault from a warning given by the warning section and therefore take an effective countermeasure such as to move the portable telephone radio set being used away from the terminal equipment externally connected to the portable telephone radio set.

The control circuit section may detect a radio wave interference fault in the course of a selection operation of a standby channel or in the course of a zone switching operation which is caused by the presence of a channel having a higher reception level than that of the channel being waited from that at least one of loss of frame synchronization, deterioration in bit error rate, unfavorable reception of broadcast information and interruption of radio waves occurs in either one of conditions of out-of-zone indication and abandonment of the pertaining channel or in a condition of abandonment of the pertaining channel. As an alternative, the control circuit section may detect a radio wave interference fault during communication from that a level value detected when the level of each of perch channels other than a peripheral perch channel designated from a base station is measured is higher than a predetermined threshold value.

As another alternative, the control circuit section may detect a radio wave interference fault during communication, when the channel is switched to a channel of a level lower than the level of the channel which has been used for communication until then, the cause of the channel switching being at least one of loss of frame synchronization, deterioration in bit error rate, and interruption of radio waves occurs.

The predetermined form in which the radio wave interference warning is displayed may include the abandoned channel number, the number of occurrences of retransmission per unit time measured during the communication, or a rate of occurrences of retransmission per unit data measured during the communication.

The portable telephone radio set is advantageous in that the user thereof can recognize an incomplete state of data communication occurring with the terminal equipment externally connected to the portable telephone radio set due to deterioration of the communication state caused by radio wave interference in the course of a standby channel selection operation or during communication and take such an effective countermeasure that the portable telephone radio set being used is moved away from the terminal equipment.

The reason is that the portable telephone radio set includes a warning section for giving a warning of radio wave interference, and when a waiting condition is not satisfied, if the cause of this is radio wave interference, the warning display section can give a warning.

The above and other objects, features and advantages of the present invention will become apparent from the following description and the appended claims, taken in conjunction with the accompanying drawings.

DESCRIPTION OF THE PREFERRED EMBODIMENT

Figure 1:
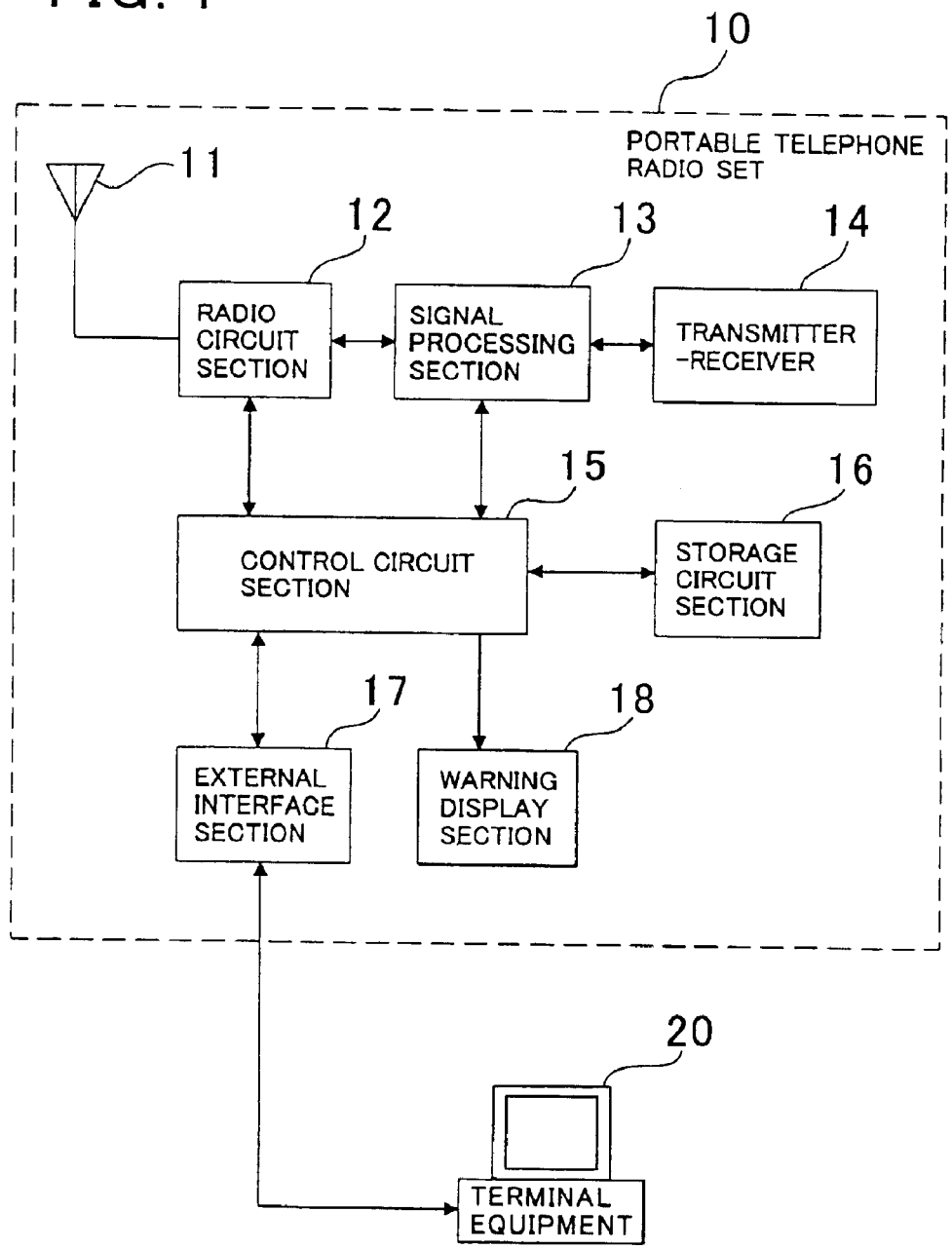
FIG. 1 is a functional block diagram showing a portable telephone radio unit to which the present invention is applied.

Referring to FIG. 1, there is shown a portable telephone radio set to which the present invention i s applied. The portable telephone radio set shown is generally denoted at 10 and includes an antenna 11, a radio circuit section 12, a signal processing section 13, a transmitter-receiver 14, a control circuit section 15, a storage circuit section 16, an external interface (IF) section 17, and a warning display section 18. A terminal equipment 20 such as a data terminal as represented by a personal computer is connected to the external interface section 17. In FIG. 1, functions other than the functions which relate to the present invention are omitted for simplified illustration.

The portable telephone radio set 10 shown FIG. 1 is different from the conventional portable telephone radio set, whose operation is described hereinabove with reference to FIG. 4, in that the control circuit section 15 has a radio wave interference detection function of detecting a fault caused by radio wave interference from data inputted thereto from the signal processing section 13 and notifies the warning display section 18 of warning information corresponding to the detected radio wave interference so that the warning information is displayed by the warning display section 18.

The antenna 11 is provided for transmission and reception in order to communicate with a base station and connected to the radio circuit section 12. The radio circuit section 12 is connected to the antenna 11 to transmit and receive a radio signal, and notifies the signal processing section 13 of a reception signal and notifies the control circuit section 15 of an input level of the reception signal. The signal processing section 13 notifies the control circuit section 15 of information of the layer 1 such as frame synchronization, color code detection and redundancy code checking (CRC) of a reception signal inputted thereto from the radio circuit section 12. Further, the signal processing section 13 transmits or receives an audio signal to be transmitted to or received from the radio circuit section 12 to or from the transmitter-receiver 14. The transmitter-receiver 14 is used for voice communication of a user.

The control circuit section 15 is connected to all functional components to provide and receive information and control functions and operations of them. A procedure of principal operations of the portable telephone radio set 10 controlled by the portable telephone radio set 10 controlled by the control circuit 15 is hereinafter described. A channel table in which levels of radio channels obtained from the radio circuit section 12 are placed in order of level is stored into the storage circuit section 16 by the control circuit section 15. The external interface section 17 is connected on one hand to the control circuit section 15 and on the other hand to the terminal equipment 20 to perform interfacing for data communication between them.

The warning display section 18 receives a notification of warning information corresponding to a fault caused by radio wave interference from the control circuit section 15 and displays a warning based on the notification as described hereinabove. Where display on a screen is employed, the display is given in the form of characters or a mark for warning of a radio wave fault or, where it can be displayed in numerical value, in the form of a numerical value corresponding to the fault. As other visible displays, a color for which a light emitting diode is used, a flickering condition and so forth are available. As an audible display, alarming sound of an audible frequency or a detailed voice guide by voice of a language for which a speaker or an earphone is used can be adopted.

Subsequently, a waiting-switching operation of a mobile station based on the RCR STD-27 standard, which is a standard specification published by the Association of Radio Industries and Business (ARIB), is described as one of the principal operations of the portable telephone radio set with an interference detection function according to the present invention with reference to both FIGS. 1 and 2.

Figure 2:
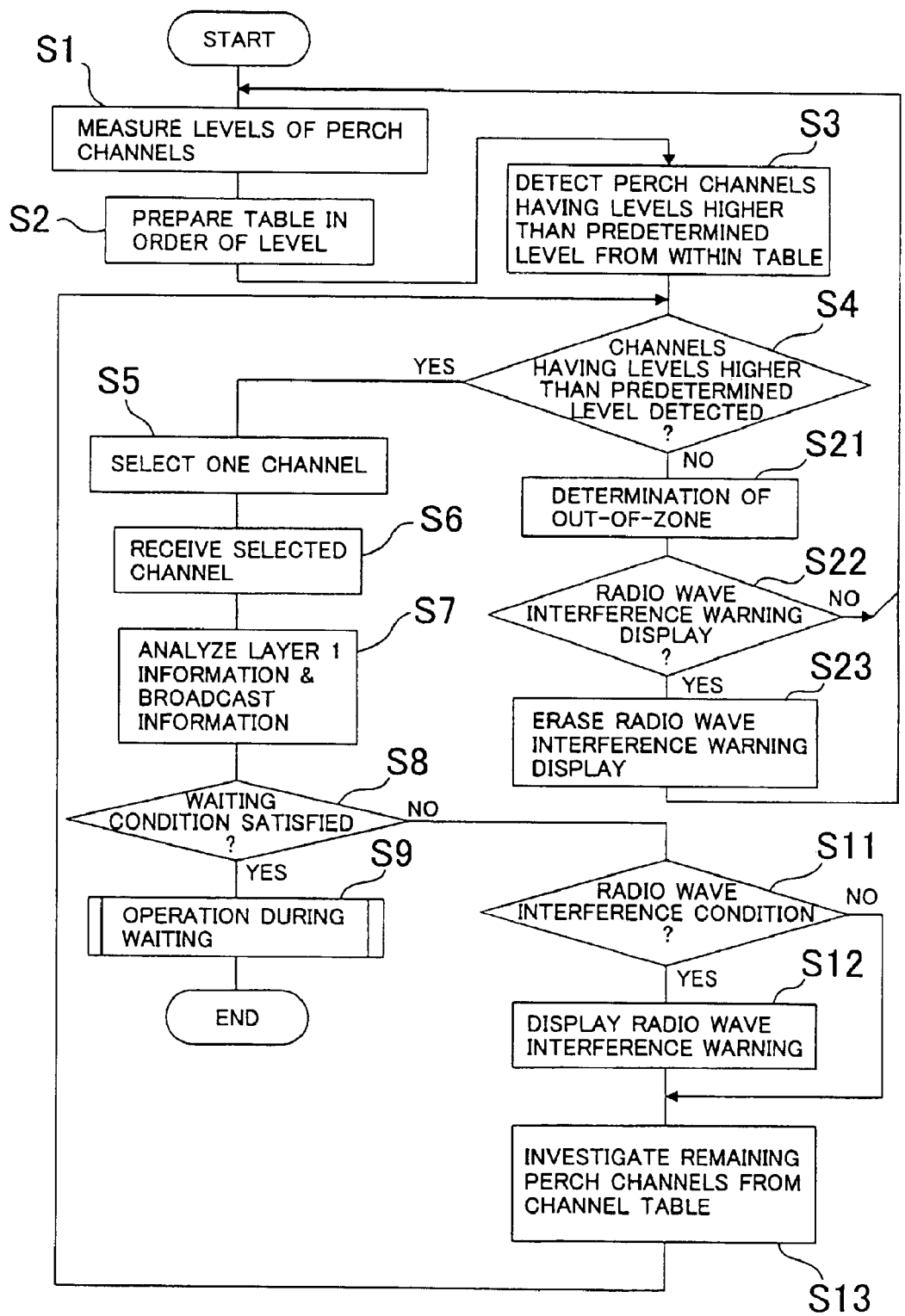
FIG. 2 is a flow chart illustrating a standby channel selection process of the portable telephone radio unit of FIG. 1.
Figure 4:
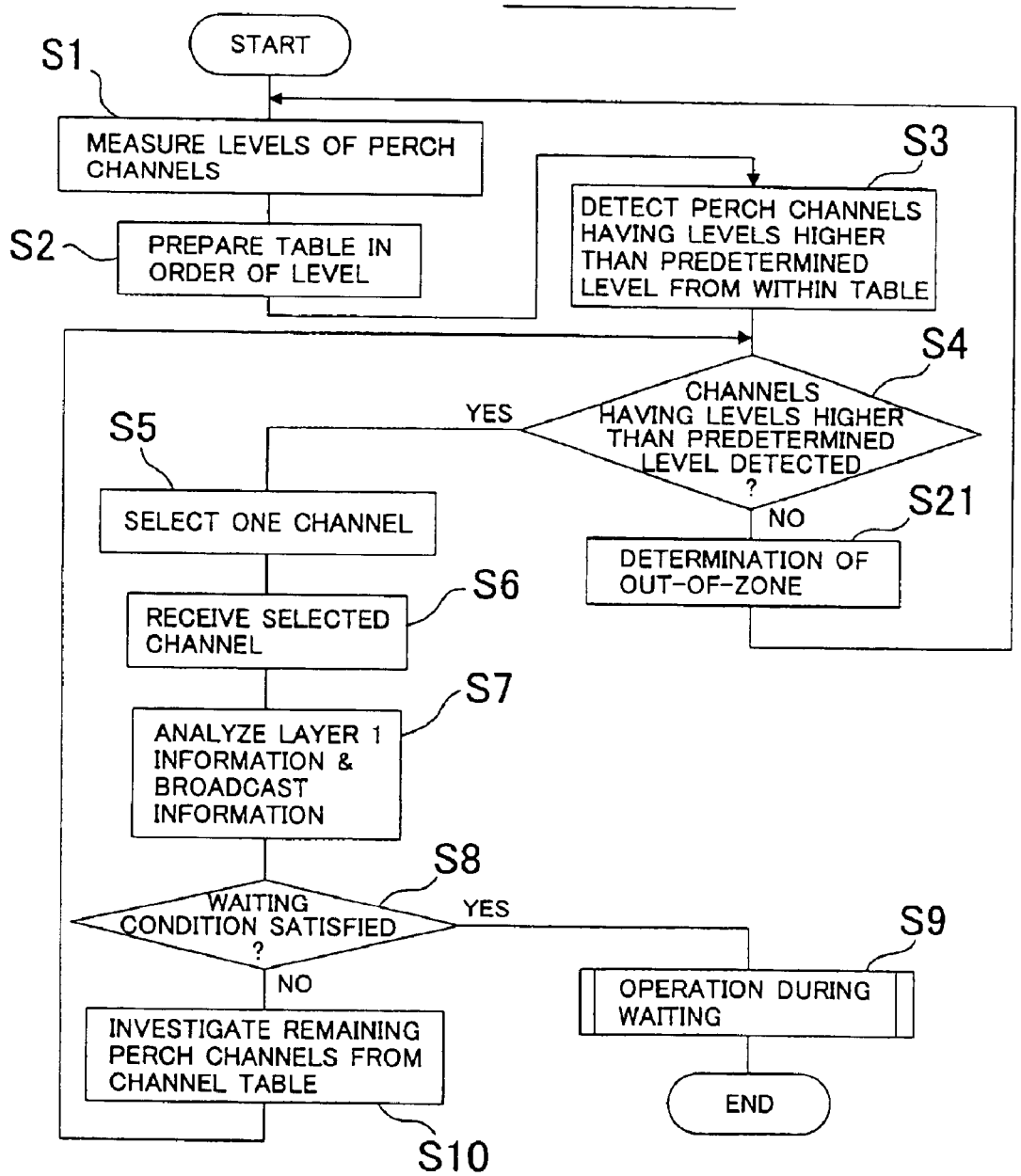
FIG. 4 is a flow chart illustrating an example of operation in a conventional standby channel selection process.

The operation of the portable telephone radio set illustrated in FIG. 2 is different from that of the conventional portable telephone radio set illustrated in FIG. 4 in that, when a perch channel selected for the object of use cannot satisfy awaiting condition and this is caused by radio wave interference, a radio wave interference warning is displayed by the portable telephone radio set.

In particular, steps S1 to S9 are similar to those of the conventional portable telephone radio set illustrated in FIG. 4. Specifically, when power supply to the portable telephone radio set 10 is made available first, the radio circuit section 12 scans perch channels from within a reception signal of the antenna 11 and measures the level of each of the channels (step S1), and notifies the control circuit section 15 of the levels of the channels. The control circuit section 15 prepares a channel table, in which the levels of the channels are arranged in order of the level, in the storage circuit section 16 (step S2). Here, the control circuit section 15 divides the perch channels into a plurality of groups and measures the levels of the perch channels and then prepares a channel table. Naturally, the control circuit section 15 may otherwise prepare a table for all channels considering them as one group.

Then, in the portable telephone radio set 10, the control circuit section 15 searches for those of the perch channels which each has a level higher than a predetermined level from within the channel table of the storage circuit section 16 (step S3). If those perch channels each having a level higher than the predetermined level are detected (YES in step S4), then the control circuit section 15 selects one of the perch channels in accordance with a predetermined method (step S5). As the predetermined method, for example, one of the channels of the pertaining group in the channel table which has the lowest level which, however, exceeds the predetermined level maybe selected. A signal of the perch channel selected in this manner is received by the signal processing section 13 from the radio circuit section 12 in response to an instruction of the control circuit section (step S6).

Then, the signal processing section 13 notifies the control circuit section 15 of analysis information of the layer 1 and broadcast information of a BCCH (announcement channel) from the received signal. The control circuit section 15 analyzes the broadcast information (step S7). The analysis information reported from the signal processing section 13 includes frame synchronization, a bit error rate, a color code and so forth. The broadcast information includes a waiting permission level, control channel (CCH) structure information, restriction information and so forth. If the level information received from the radio circuit section 12 and the information received from the signal processing section 13 satisfy a waiting condition (YES in step S8), then the control circuit section determines that a waiting state is proceeding and advances the processing to a waiting operation (step S9).

On the other hand, if the discrimination in step S8 described above is "NO" because the waiting condition is not satisfied, then the control circuit section 15 discriminates a radio wave interference condition (step S11). The radio wave interference condition may include loss of frame synchronization, deterioration of the bit error rate, unfavorable reception of broadcast information or detection of radio wave interruption. If the cause by which the waiting condition is not satisfied is the presence of the condition of radio wave interference and consequently the discrimination instep S11 is "YES", then the control circuit section 15 controls the warning display section 18 to display a warning of "radio wave interference is present" by some suitable means (step S12) and investigates the remaining perch channels in order to select a next perch channel having a level higher than the predetermined level from within the channel table of the storage circuit section 16 (step S13), whereafter the processing returns to step S4 described above. If the discrimination in step S4 is "YES" and one channel is selected in step S5, then the operations in steps S4 to S13 are repeated until the discrimination in step S8 becomes "YES" because the waiting condition is satisfied or until the discrimination in step S4 becomes "NO" because there remains no channel having a level higher than the predetermined level any more. If the discrimination in step S11 described above is "NO" because the condition of radio wave interference is not satisfied, then the processing skips step S12 and advances directly to step S13 without displaying a warning.

On the other hand, when the discrimination in step S4 is "NO" because there is no channel having a level higher than the predetermined level, the control circuit section 15 discriminates that the portable telephone radio set 10 is outside the range of the object perch channel group (step S21) and discriminates whether or not there is a warning of radio wave interference (step S22). If the discrimination in step S22 is "YES" because a radio wave interference warning is being displayed, then the control circuit section 15 erases the display of the radio wave interference warning (step S23) and returns the processing to the first step S1. Consequently, the control circuit section 15 starts level measurement of perch channels included in a next group and repeats the procedure in a similar manner as described above. If the discrimination in step S22 described above is "NO" because there is no display of a radio wave interference warning, then the processing skips step S23 and returns to step S1.

Figure 3:
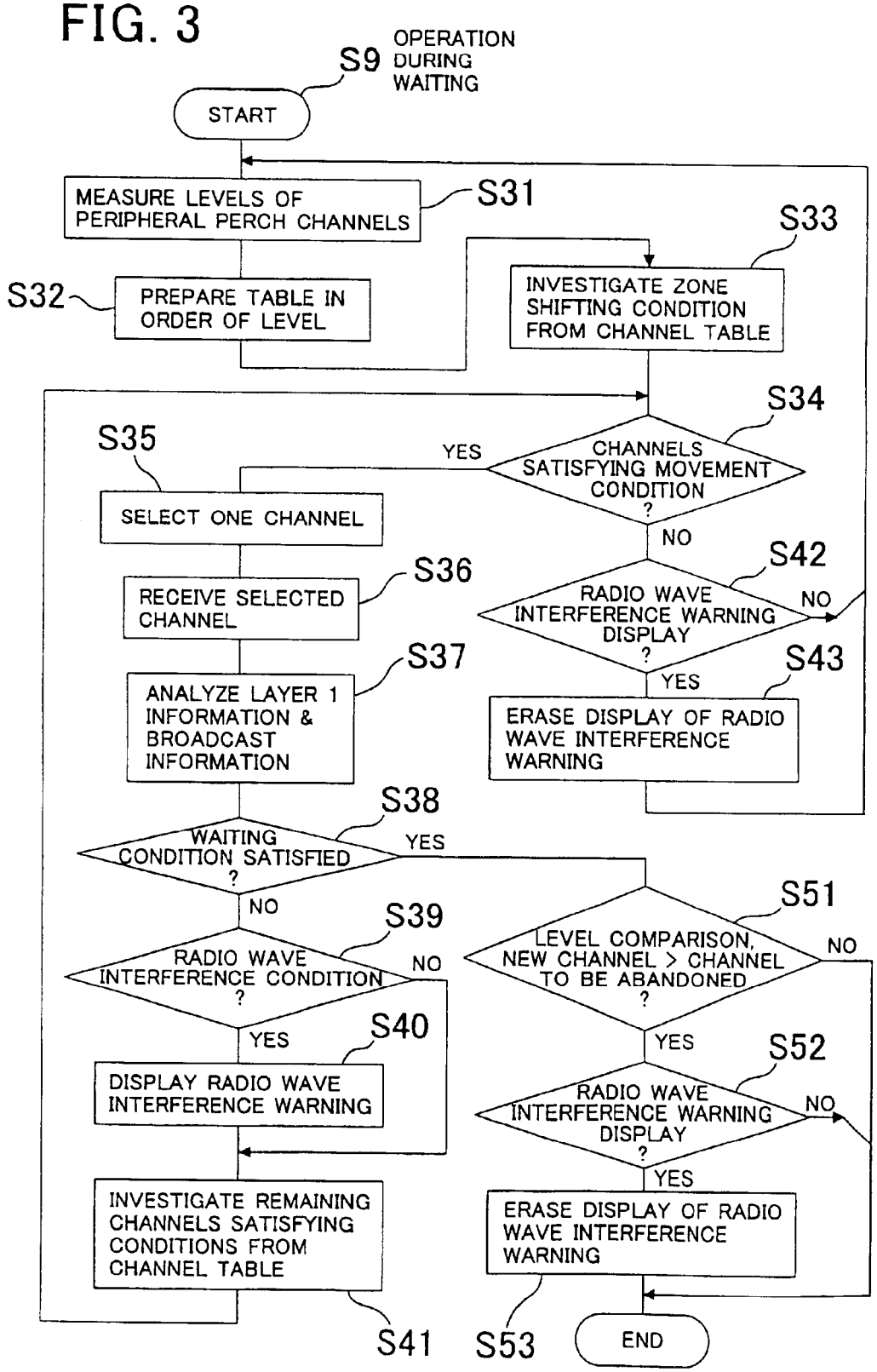
FIG. 3 is a flow chart illustrating detailed operation during waiting in the process illustrated in FIG. 2.

Subsequently, an operation procedure during waiting in step S9 of FIG. 2 is described with reference to FIGS. 1 and 3.

While a channel which satisfies the waiting condition is selected and remains in a waiting state, the radio circuit section 12 scans peripheral perch channels around the selected channel from within a reception signal of the antenna 11 to measure the levels of the channels (step S31) and notifies the control circuit section 15 of the levels of the channels. The control circuit section 15 prepares a channel table which includes the levels in order of the level in the storage circuit section 16 (step S32). Then, the control circuit section 15 investigates a predetermined condition of switching between zones from with in the channel table of the storage circuit section 16 (stepS33). If those peripheral perch channels which satisfy the predetermined condition for switching between zones are present (YES in step S34), then the control circuit section selects one of the peripheral perch channels (step S36). A signal of the peripheral perch channel selected in this manner is received together with reception information by the signal processing section 13 from the radio circuit section 12 in response to an instruction of the control circuit section 15 (step S36).

Then, the signal processing section 13 notifies the control circuit section 15 of analysis information of the layer 1 and broadcast information. This information is from within the received signal. The control circuit section 15 analyzes the layer 1 information and broadcast information (step S37). The analysis information in the notification includes frame synchronization, a bit error rate, a color code and so forth. The broadcast information includes a waiting permission level, control channel (CCH) structure information, restriction information and so forth. If the level information received from the radio circuit section 12 and the information received from the signal processing section 13 do not satisfy the waiting condition (NO in the step S38), then the control circuit section 15 determines whether there is a radio wave interference condition (step S39). If the determination in step S39 is "YES" because the waiting condition is not satisfied as a result of the presence of a radio wave interference condition, then the control circuit section 15 controls the warning display section 18 to display a warning of "Radio wave interference is present" by some suitable means (step S40) and investigates those remaining peripheral perch channels which satisfy the switching condition in order to select a next peripheral perch channel having a level higher than the predetermined level. This selection is made from within the channel table of the storage circuit section 16 (step S41), whereafter the control circuit section 15 returns its processing to step S34.

If the discrimination in step S34 is "YES" and a channel is selected in step S35, then the procedure is repeated until the discrimination in step S38 becomes "YES" because the waiting conditions are satisfied or until the discrimination in step S34 becomes "NO" because there remains no channel which satisfies the switching condition up to the last channel. If the discrimination in step S39 is "NO" because the radio wave interference condition is not satisfied, then the processing skips step S40 and advances directly to step S41 without displaying a warning. On the other hand, if the discrimination in step S34 described above is "NO" because there is no channel which satisfies the switching condition, then the control circuit section 15 discriminates whether or not a radio wave interference warning is present (step S42). If the discrimination in step S42 is "YES" because a radio wave interference warning is being displayed, then the control circuit section 15 controls the warning display section 18 to erase the display of the radio wave interference warning (step S43) and returns its processing to the first step S31 so that it starts level measurement of peripheral perch channels included in a next group so that the procedure is repeated in a similar manner as described above. If the discrimination in step S42 described above is "NO".because there is no display of a radio wave interference warning, then the processing skips step S43 and returns to step S31.

On the other hand, if the discrimination in step S38 is "YES" because there is a channel which satisfies the waiting condition, then the control circuit section 15 performs level comparison between the new channel of the destination of the switching and the standby channel to be abandoned (step S51).

In this instance, if the discrimination in step S51 is "YES" because the level of the new channel-is higher than the level of the channel to be abandoned and besides there is a display of a radio wave interference warning provided by step S40 (YES in step S52), then the control circuit section 15 erases the display of the radio wave interference warning (step S53), thereby ending the procedure. If the discrimination in step S51 described above is "NO" because the level of the new channel is lower than the level of the channel to be abandoned, then the control circuit section 15 ends the procedure irrespective of whether or not there is a display of a radio wave interference warning. Further, also when the discrimination in step S52 is "NO" because there is no display of a radio wave interference display, the control circuit section 15 ends its procedure immediately.

A predetermined radio wave interference fault during communication may otherwise be determined when a level value higher than a predetermined threshold value is detected in level measurement of the perch channels other than the peripheral perch channel designated by a base station.

Meanwhile, the predetermined form in displaying a radio wave interference warning may include the channel number abandoned, the number of occurrences of retransmission per unit time measured during communication or the retransmission occurrence rate per unit data measured during communication.

While the foregoing description is given with reference to the functioning blocks and the steps illustrated in the drawings, separation or merge of functions or movement of a procedure is possible as far as the functions described above are satisfied, and the foregoing description shall not restrict the present invention.

Further, while the foregoing description is given taking a mobile machine which conforms with the RCR standard 27 for setting a perch channel as an example, it can be similarly applied also to a personal station of a mobile terminal of the PHS (Personal Handyphone System) which conforms with the RCR standard 28 in terms of channel changing over in the course of a standby channel selection operation or during communication.

In particular, a personal station includes a warning display section for giving a radio wave interference warning, and when a channel is to be established or when a channel is to be changed over during communication, if the channel cannot be established or the switching is impossible because of radio wave interference detected by an information analysis of a BCCH, then a control circuit section of the personal station controls the warning display section to display a warning. However, if the cause of the radio wave interference disappears as a result of establishment or switching of the channel, then the control circuit section controls the warning display section to erase the warning display of radio wave interference.

Also a portable telephone radio set which confirms with any other standard similarly includes a warning display section for giving a radio wave interference warning such that, if a channel cannot be established because of radio wave interference detected by an information analysis, then a warning is displayed by the warning display section. However, if the cause of the radiowave interference disappears as a result of establishment, then the warning display of radio wave interference us erased.

While a preferred embodiment of the present invention has been described using specific terms, such description is for illustrative purposes only, and it is to be understood that changes and variations may be made without departing from the spirit or scope of the following claims.

What is claimed is:

1. A portable telephone radio set to which a terminal equipment can be externally connected to effect data communication therewith, said portable telephone set having an interference detection function comprising:
  a warning section for providing warning of radio wave interference to a user of said portable telephone radio set, said warning being provided by audio or visual signals; and
  a control circuit section for selecting and switching among perch channels, said control circuit detecting interference of radio waves on a selected perch channel and controlling said warning section;
  said control circuit section reporting, when said control circuit section detects a radio wave interference fault, a type of the fault to said warning section so that said warning section provides a warning of radio wave interference in a predetermined form based on at least one of visibility and audibility.

2. A portable telephone radio set with an interference detection function as claimed in claim 1, wherein said control circuit section detects a radio wave interference fault in the course of a selection operation of a standby channel from that at least one of loss of frame synchronization, deterioration in bit error rate, unfavorable reception of broadcast information and interruption of radio waves occurs in either one of conditions of out-of-zone indication and abandonment of the pertaining channel.

3. A portable telephone radio set with an interference detection as claimed in claim 1, wherein said control circuit section detects a radio wave interference fault in the course of a zone switching operation which is caused by the presence of a channel having a higher reception level than that of the channel being waited from that at least one of loss of frame synchronization, deterioration in bit error rate, unfavorable reception of broadcast information and interruption of radio waves occurs in a condition of abandonment of the pertaining channel.

4. A portable telephone radio set with an interference detection function as claimed in claim 1, wherein said control circuit detects a radio wave interference fault during communication from that a level value detected when the level of each perch channel, other than a peripheral perch channel designated from a base station, is measured as being higher than a predetermined threshold value.

5. A portable telephone radio set with an interference detection function as claimed in claim 1, wherein said control circuit section detects a radio wave interference fault during communication when the channel is switched to a channel of a level lower than the level of the channel which has been used for communication until then, the cause of the channel switching being at least one of loss of frame synchronization, deterioration in bit error rate, and interruption of radio waves occurs.

6. A portable telephone radio set with an interference detection function as claimed in claim 1, wherein the predetermined form in which the radio wave interference warning is displayed includes an abandoned channel number.

7. A portable telephone radio set with an interference detection function as claimed in claim 1, wherein the predetermined form in which the radio wave interference warning is displayed includes a number of occurrences of retransmission per unit time measured during the communication.

8. A portable telephone radio set with an interference detection function as claimed in claim 1, wherein the predetermined form in which the radio wave interference warning is displayed includes a rate of occurrences of retransmission per unit data measured during the communication.

* * * * *